United States Patent Office 2,906,184
Patented Sept. 29, 1959

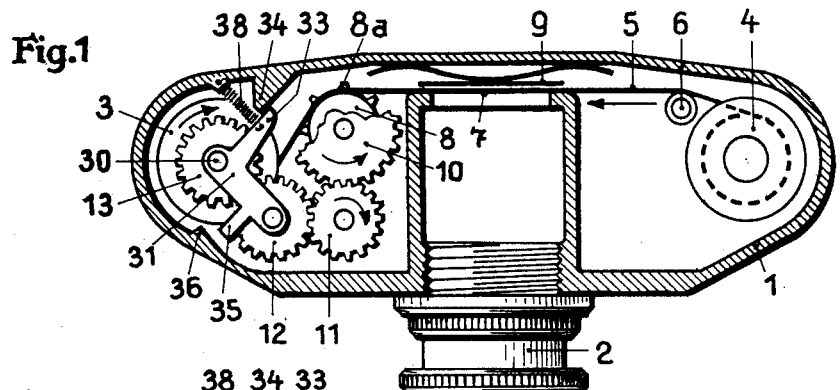
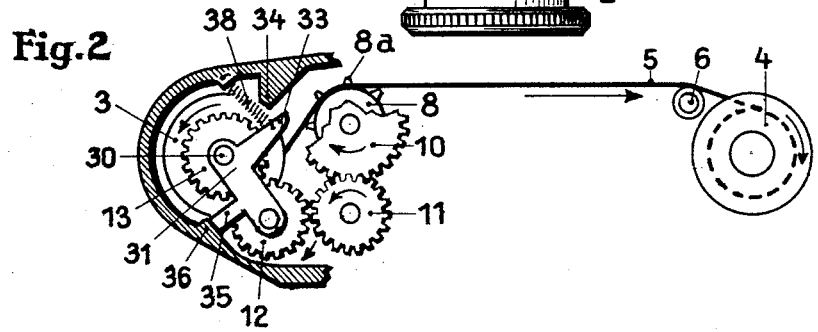
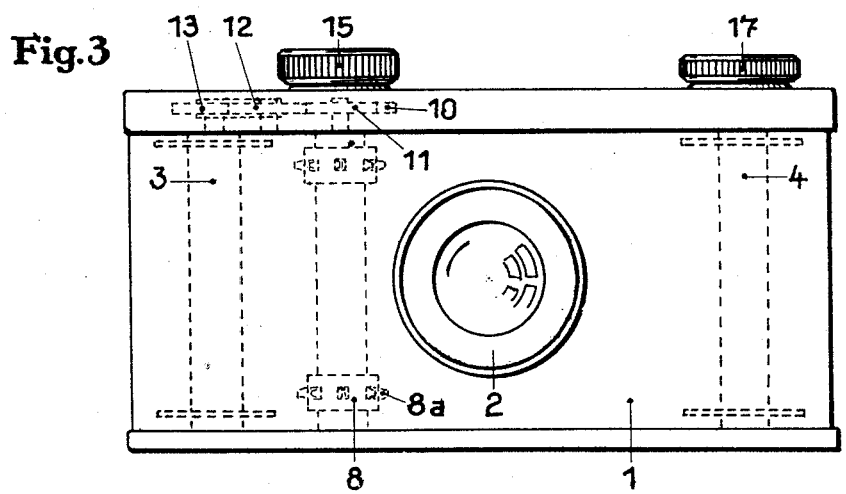
Inventors:
Walter Hennig
Horst Strehle
Arthur Mende

2,906,184

GEAR ASSEMBLY, IN PARTICULAR FOR CAMERAS AND THE LIKE

Walter Hennig, Horst Strehle, and Arthur Mende, Dresden, Germany, assignors to VEB Zeiss Ikon Dresden, Dresden, Germany Application February 21, 1957, Serial No. 641,558

3 Claims. (Cl. 95—31)

This invention relates to improvements in gear assemblies and has particular relation to a gear assembly including a gear train which is adapted to operate in intermeshing engagement upon being driven in one direction, and to have its transmission interrupted when driven in the opposite direction. The gear assembly of the invention is particularly intended for use in still cameras, motion picture cameras, cassettes or the like, for example as part of the film winding structure, although it will find obvious uses in many other structures which normally include gear trains.

It is an object of this invention to provide a gear assembly which will permit forward and reverse movements of its gear elements in selected meshed or unmeshed relationship without the necessity of additional manual operations to effect uncoupling of portions of the gear train. This is accomplished by the provision of a gear wheel which automatically adjusts itself for selective operation as a drive gear and as an idler gear.

Such adjustment or control operations are required, for example, in cameras for the film advancing mechanism, for the shutter tensioning mechanism, etc., it being the usual practice to effect the forward and reverse adjustments by manually operated means, as a separate button or lever on the camera body.

In accordance with the present invention there is provided a gear assembly comprising a gear train, the individual gears of which will intermesh when turned in one direction and in which certain of the gears will automatically disengage to interrupt the gear transmission if the direction of movement is reversed.

In the following specification an embodiment of the invention is described in connection with the forward and backward winding of the film in a camera. This embodiment in this setting clearly reveals the operation of the gear assembly and the advantages of the invention as compared to known arrangements of the same type. In photographic apparatus such as cameras, cassettes, or the like, it is common to effect the advance movement of the film predominantly by means of a special transport roller which drives the film forwardly for each exposure by an exact amount corresponding to the width of a single exposure or frame. At the same time, during the advance or forward movement, the transport roller positively drives the film take-up spool through a gear train connection.

The positive drive of the take-up spool by the transport roller presents the problem of providing a differential arrangement to permit the take-up spool to rotate at a different rate of rotation than the transport roller, as the effective outer diameter of the take-up spool increases when film is wound thereon. To meet this problem, the transmission between the transport roller and the film take-up spool is arranged in such a manner that the film winding spool has a greater angle of rotation than the transport roller, and the differences occuring between the film advance and take-up are compensated for by a slip clutch on the take-up spool. Such compensating arrangements are well-known and widely used.

In rewinding the film from the take-up spool to the film spool or magazine spool, the film spool will again turn faster than the transport roller but in a reverse direction. Obviously, the differences in rotational speed cannot here be compensated for by the slip clutch. Since the transport roller grips the film and since the take-up spool is feeding off film faster than it can be transported by the slower-turning transport roller, excess film lengths will build up in the camera body, causing the film to bend and buckle, and eventually causing jamming of the mechanism. In order to prevent such accumulation of film, it is necessary to provide means for uncoupling or disengaging the film transport roller from the take-up spool, during the back-winding or reverse spooling of the film. Gear arrangements for this purpose are known, but these involve very complicated and expensive mechanism, and even more important, they invariably require an additional hand actuation before back-winding can be commenced.

The present invention is concerned with such an uncoupling arrangement which is actuated automatically when the back-winding of the film is under way. Thus, manual controls and special blocking mechanisms can be dispensed with. This is made possible according to the present invention by a gear train containing a movable gear which automatically meshes within the gear train when turned in one direction, and automatically disengages from the gear train to interrupt the transmission of the latter when the gear train is turned in a reverse direction.

Additional objects and advantages of the invention will be apparent from the following description when read in conjunction with the accompanying drawings which illustrate one form of the invention, and in which:

Fig. 1 is a horizontal section through the top of a camera and showing the film transport assembly including the gear train of the invention;

Fig. 2 is a plan view of the film transport assembly and gear train illustrated in Fig. 1, but with the gear train in interrupted position and the camera body omitted; and Fig. 3 is a front elevational view of the camera shown in Fig. 1, with the internal portions thereof material to the invention shown in broken line.

Referring in detail to the drawings, there is shown a camera casing 1 which has the usual objective or lens 2, film take-up spool 3, and film or magazine spool 4. The unexposed film 5 is withdrawn from the magazine spool 4 and is guided by guide roller 6 to a position behind the image window 7. In advancing the film, the film is driven by the transport roller 8 and the exposed film wound up on the take-up spool 3. The transport assembly is particularly adapted for use with film having sprocket holes, for example the widely-used 35 millimeter film, and for this purpose the transport roller 8 has a row of sprockets 8a at top and bottom. The film 5 is pressed against the image window 7 by means of a spring-tensioned pressure plate 9, whereby the frame of film is pressed flat for exposure. The transport roller 8 may be adapted in the customary manner to turn through a selected distance and then be automatically stopped when the film behind the window 7 has been advanced by one frame.

The film transport roller 8 is normally connected with the take-up spool 3 by means of gears 10, 11, 12 and 13. The gear 10 is secured to the upper end of film transport reel 8, while gear 13 is connected to the film take-up spool 3 by means of being secured to a keyed mounting shaft 30 connected to the axis of spool 3.

One end of a lever 31 is pivotally or swingably mounted on the mounting shaft 30. At the opposite end of lever 31, the gear 12 is rotatably mounted. The length of the lever 31 is such that the gear 12 is always in mesh with gear 13, regardless of the pivoted position of lever 31. The gear 11 is rotatably mounted on a fixed pivot secured to the camera casing 1 or an extension plate (not shown) rigid with the casing, and is thus constantly in mesh with gear 10. The film transport roller 8 has a knob 15 located exteriorly of the top of the camera casing, which is used to advance the film by being turned in a counter-clockwise direction. Such counter-clockwise turning of knob 15, results in driving the take-up spool 3 in a clockwise direction, as shown by the arrows in Fig. 1, through the train of gears 10, 11, 12 and 13. The gear 10 may be designated a drive gear and the gear 13 a driven gear. The transmission ratio of the gear train is such that the driven gear 13 connected to take-up spool 3 has a smaller circumference, and therefore a lesser number of gear teeth, than the drive gear 10 which is connected to transport roller 8. Thus, as the transport roller 8 is turned by knob 15 through an angle of rotation equal to or slightly larger than the width of one frame, the take-up spool 3 is turned through a greater angle of rotation. To compensate for difference occurring between the film advance and take-up due to an increase in the effective diameter of the take-up spool, a slip coupling of conventional design is associated with the take-up spool 3. Such a slip coupling is very well-known and is universally used in cameras of this type, and is therefore not illustrated since its structure forms no part of the instant invention. It is sufficient to note that the slip coupling is incorporated between the mounting shaft 30 and its usual terminal key (not shown) which engages the central socket at the top end of film take-up spool 3. The slip coupling may be spring tensioned to operate in the usual manner to permit the spool 3 to lag in rotation behind the rotation of its gear 13. The slip clutch serves to compensate for the variation in angle of rotation which occurs between the film transport roller 8 and film spool 3 when the film is wound onto the device. When the film is unwound the slip clutch is not actuated because the gear train is interrupted and the angle of rotation of both the roller 8 and film spool 3 is the same.

Because of the particular gear arrangement described above, and in particular the mounting of gear 12 on the lever 31, which is swingably mounted on the shaft 30, the gear 12 remains in constant meshed engagement with the gear 11 during the film advance movement of the gear train, as shown in Fig. 1. This meshed engagement of gear 12 with gear 11 is effected by the clockwise turning of gear 11 which engages the teeth of gear 12 and urges gear 12 in an upward direction as viewed in Fig. 1, that is to say in a counter-clockwise pivoted direction toward its meshed position with gear 11. To insure this meshed relationship during the advance movement of the film 5, a tension spring 38 is connected at one end to the lever 31 and at its other end to a depending extension 34, fixed to or integral with the camera casing 1. Since the spacing between the centers of gears 11 and 13 is smaller than the diameter of gear 12 plus the respective radii of gears 11 and 13, clockwise rotation of gear 11 causes it to urge gear 12 to a position between gears 11 and 13, and since gear 12 cannot reach this position, it is urged into firm meshing engagement with gear 11.

After the film 5 has been exposed, it is necessary to rewind the film from the take-up spool 3 to the magazine film 4 for removal from the camera. For this purpose, the camera is provided with a rewind knob 17 which is keyed to the magazine spool 4. When the rewind knob 17 is turned in a clockwise direction to rewind the film 5 onto the magazine spool 4, the film traverses the take-up roller 8 and engages its sprockets 8a to turn the roller 8 and its connected gear 10 in the clockwise direction shown by the arrows in Fig. 2. This clockwise rotation of the film transport roller would be transmitted to the film spool 3 through gears 11, 12 and 13, but in that event, the take-up spool 3 would turn faster than the transport roller 8 because of the step-up gear ratio between gears 10 and 13. In this event, the slip clutch would be ineffective in retarding the rotational rate of the take-up spool 3 and film would accumulate between the take-up spool and transport roller 8.

The gear train is thus adapted to interrupt itself automatically when the film is rewound. This is accomplished by action of the lever 31, as follows:

Upon backwinding of the film 5, the gear 11 turns in a counter-clockwise direction, as indicated by the arrows in Fig. 2, and the tangential force of its teeth tends to push the movable gear 12 away from gear 11. In other words, the gear 12 is pushed in a downward direction as viewed in Fig. 2, with its lever 31 urged to swing in a clockwise direction about its pivot 30. In order to enable the gears 11 and 12 to reenter their meshed relationship at the end of the backwinding operation, the spring 38 biases the lever in a counter-clockwise direction. For this purpose, spring 38 is balanced with just enough tension to return the gear 12 back to its meshed engagement with gear 11.

The lever 31 has on its opposite sides projecting extension elements or noses 33 and 35 which restrict the swinging motion of said lever 31. When the film 5 is advanced from magazine spool 4 to take-up spool 3, as shown in Fig. 1, the gear 11 meshes with gear 12 and urges the gear 12 and its lever 31 in a counter-clockwise direction of pivoting. To avoid jamming in the intermeshing engagement of gears 11 and 12, when the gear train is turned in this manner. The counter-clockwise swinging of lever 31 is limited by engagement of its extension element 33 with the fixed casing extension piece 34. The same limitation in the clockwise swinging movement of lever 31 is effected by the extension element 35 engaging a fixed abutment or extension 36 of the camera casing during rewinding of the film. Actually the abutment 36 is provided only for reasons of added safety since the swinging or rocking movement of lever 31 in a clockwise direction is limited by tension of the spring 38. Said spring 38 actually prevents gear 12 from moving an appreciable distance from gear 11; the position of gear 12 shown in Fig. 2 being exaggerated and being illustrated for purposes of explanation.

When the gear 11 is driven in the counter-clockwise direction shown in Fig. 2, the gear 12 is urged outwardly away from gear 11 only far enough to permit the top edge of its teeth to clear the top edge of the teeth of gear 11. When one tooth of gear 11 pushes the gear 12 away until the said tooth clears the corresponding tooth of the gear 12, the spring will then draw the gear 12 back into engagement with gear 11 and the pushing-away operation is repeated by the next succeeding tooth of gear 11. Thus, during the rewinding of the film, the transport reel 8 is operatively disengaged from its former driving relation with take-up spool 3, and the latter is turned only by the film being unwound therefrom. The take-up spool 3, therefore, rotates in a counter-clockwise direction only rapidly enough to feed off the film 5 as required.

The present invention is not limited to control arrangements for film advance and rewinding as described above, but the principle of the invention, that is to say the same gear train suitably adapted, can obviously be also utilized for tensioning a camera shutter or for controlling photoelectric exposure meters in the photographic art. Moreover, the gear assembly of the invention may advantageously be used in other devices as will be evident to those skilled in the art, as in projection apparatus, in reproduction and copying apparatus, in the toolmaking art, etc. Furthermore, the invention is not limited to the specific gear arrangement shown in the drawings, as numerous additions, changes, and omissions may be made therein without departing from the spirit and scope of the invention.

What is claimed is:

1. A gear assembly comprising a gear train including a first gear, a second gear, an intermediate gear between said first and second gears, a lever pivotally mounted at one end to the rotational axis of said second gear, said intermediate gear being mounted for rotation on the other end of said lever in a position to mesh with said second gear and to move about the circumference of said second gear when the lever is pivoted, and biasing means urging said lever in a direction toward said first gear, the centers of said first and second gears being spaced apart a distance smaller than the diameter of said intermediate gear, the biasing means being operative to hold the intermediate gear in mesh with the first gear when the first gear is driven in one direction, said lever being pivotable away from said first gear to bring the movable gear out of meshing engagement with the first gear thereby interrupting the gear train by the outward pushing force of the teeth of the first gear on the intermediate gear when the first gear is turned in the opposite direction.

2. An automatically disengaging gear train for engagement to cause uni-directional rotation of a driven gear and for disengagement to cause halting of said driven gear; comprising four meshable gears, the first and second ones of said gears being arranged to mesh together and each being rotatable about fixedly located first and second pivots, the third one of said gears being rotatable about a third pivot fixedly located a predetermined distance from said second pivot, a lever mounted at one end for swinging movement about said third pivot and being provided with a fourth gear pivot at the other end thereof, the fourth one of said gears being mounted for rotation about said fourth gear pivot, the distance along said lever of said fourth pivot from said third pivot being such as to maintain constant meshing engagement of said fourth gear with said third gear during swinging of said lever, said predetermined distance between said third pivot and said second pivot being smaller than the diameter of said fourth gear plus the respective radii of said second and third gears, and biasing means for urging said lever in a direction to cause said fourth gear to mesh with said second gear, whereby during rotation in one direction of said first gear, rotary motion will be transmitted through said second and fourth gears to drive said third gear, and whereby during rotation in an opposite direction of said first gear, said fourth gear on said lever will automatically swing out of engagement with said second gear.

3. In a camera or the like having a film magazine spool, a film take-up spool, and a film transport roller for engaging and advancing the film from the magazine spool to the take-up spool, a gear train interconnecting the transport roller and take-up spool for driving the latter when the transport roller is turned in a direction to advance the film, said gear train including an intermediate movable gear positioned to mesh with adjacent gears in the gear train when said film is advanced, control means for automatically moving the intermediate gear out of meshing position with said gear train to interrupt the drive transmission to said take-up spool when the transport roller is turned in the opposite direction to rewind the film, said control means including a lever mounted at one end on a pivot and carrying the movable gear at the other end, said lever being pivotally mounted on the rotational axis of said take-up spool, the gear train also including a first gear rotatable with the take-up spool and a second gear, the movable gear meshing with and coupling the first gear and the second gear when the film is advanced and being positioned to be pushed away from said second gear on its pivoted lever when the gear train is turned in a direction to rewind said film.

References Cited in the file of this patent
UNITED STATES PATENTS

| | | |
|---|---|---|
| 2,135,638 | Goldhammer | Nov. 8, 1938 |
| 2,275,497 | Berndt | Mar. 10, 1942 |
| 2,275,498 | Berndt | Mar. 10, 1942 |